Dec. 31, 1935.  H. L. MATHIAS  2,026,481
CLUTCH MECHANISM FOR OUTBOARD TRANSMISSIONS
Filed July 24, 1933   2 Sheets-Sheet 1

Henry L. Mathias
INVENTOR
BY Victor J. Evans & Co.
ATTORNEY

Dec. 31, 1935.  H. L. MATHIAS  2,026,481
CLUTCH MECHANISM FOR OUTBOARD TRANSMISSIONS
Filed July 24, 1933    2 Sheets-Sheet 2
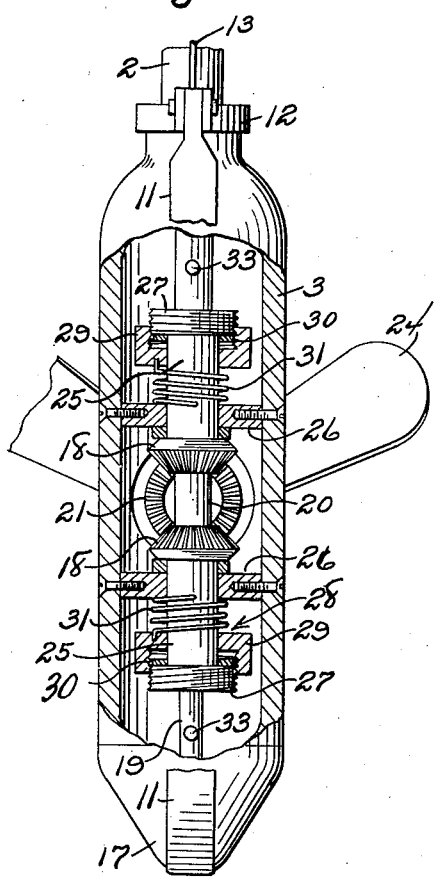
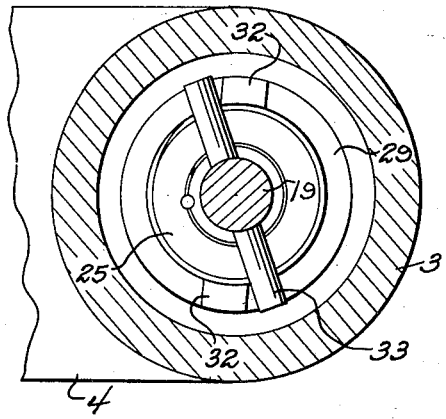
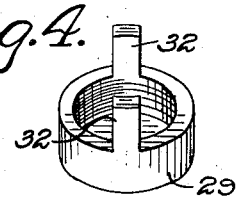
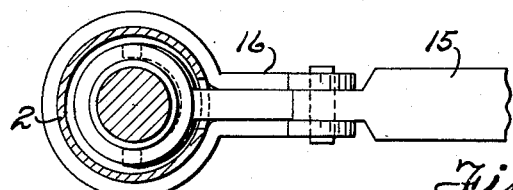
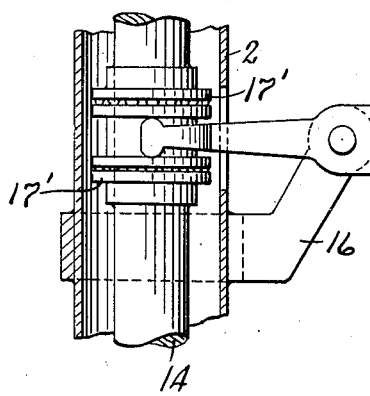
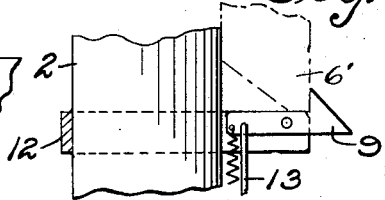
Henry L. Mathias
INVENTOR
BY Victor J. Evans & Co.
ATTORNEY Patented Dec. 31, 1935

2,026,481

UNITED STATES PATENT OFFICE 2,026,481

CLUTCH MECHANISM FOR OUTBOARD TRANSMISSIONS

Henry L. Mathias, Amsterdam, N. Y.

Application July 24, 1933, Serial No. 682,023

1 Claim. (Cl. 192—32)

This invention relates to transmissions for outboard and inboard engines for boats or for any purpose wherein it is desired to provide a forward or reverse drive with a neutral position between power and driven shafts and has for the primary object the provision of a device of the above stated character which will be inexpensive to manufacture and may be readily adapted to conventional units without undue alterations to said units and which will be extremely easy to operate.

Another object of this invention is the provision of continuously meshing gears and clutches for the transmission whereby wear on said gears will be reduced to a minimum and the clutches providing shock absorbing means to reduce strain on the various units to a minimum and permit smooth starting of the driven unit by the drive unit.

With these and other objects in view this invention consists in certain novel features of construction, combination and arrangement of parts to be hereinafter more fully described and claimed.

For a complete understanding of my invention, reference is to be had to the following description and accompany drawings, In the drawings:

Figure 2 is a fragmentary sectional view illustrating the transmission.

Figure 3 is a sectional view taken on the line 3—3 of Figure 1.

Figure 4 is a perspective view illustrating a drive nut forming a part of the clutch.

Figure 5 is a sectional view taken on the line 5—5 of Figure 1.

Figure 6 is a fragmentary vertical sectional view illustrating the connection between the drive shaft and the control lever.

Figure 7 is a fragmentary sectional view showing the latch means for locking the engine and the transmission thereof against swinging movement on the pivotal mounting for the engine.

Figure 1:
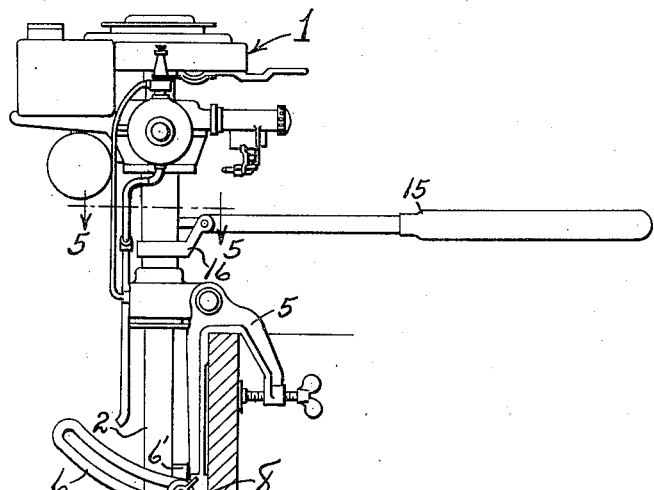
Figure 1 is a side elevation partly in section illustrating the application of my invention to an outboard engine mounted on a fragmentary portion of a boat.
Figure 8:
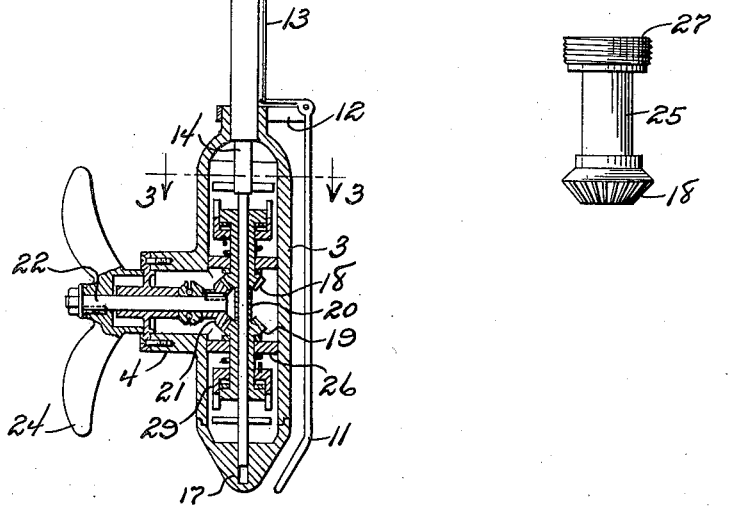
Figure 8 is an enlarged side elevation illustrating one of the transmission gears having integral therewith a portion of a clutch.

While this invention will be described as applied to an outboard engine for boats, it is to be understood that its application to other types of power mediums may be successfully accomplished.

Referring in detail to the drawings, the numeral 1 indicates an outboard engine of the conventional type having a power shaft housing 2 carrying a transmission housing 3 and the latter is provided intermediate its ends with a laterally extending propeller shaft housing 4. The drive shaft housing 2 adjacent the engine 1 is pivoted to an attaching bracket 5 employed for clamping the engine to the stern of the boat and to adjust the housing perpendicularly to various sterns of boats. The bracket carries slotted guide arms 6 to which a bearing block 6' is adjustably secured by bolts 7 extending through the slots and having wing nuts 8. The housing bears against the block during forward drive of the boat, and to prevent the housing from moving away from the block or the engine pivoting on the bracket during reverse drive, a latch 9 is provided and is carried by the housing 2 and engages the block 6'. A trigger 11 extends parallel with the transmission housing 3 and in advance thereof and is pivoted to a bracket 12 carried by the upper end of the transmission housing. The pivoted end of the trigger is in the form of a bell crank to which is pivoted a rod 13 connected to the latch 9. The latch is of the spring-pressed type normally urged in engagement with the bearing block 6' and when the transmission housing comes in close proximity to the bottom of a body of water or a submerged object, the trigger 11 will be rocked upon its pivot freeing the latch 9 from its keeper, permitting the engine to pivot on the bracket 5, causing the transmission and propeller of the engine to swing upwardly in the water and pass over the obstruction without injury.

The drive shaft of the engine is indicated at 14, and its connection to the engine is in any conventional manner so that the shaft will be driven by the engine besides being able to be moved upwardly and downwardly in the housing 2 by a control lever 15. The control lever 15 is pivoted to a bracket 16 on the housing 2 and is provided with a forked end operating between anti-friction bearings 17' carried by the shaft so that a downward movement of the free end of the control lever will impart an upward movement to the drive shaft and vice versa when said control lever is moved upwardly. The drive shaft 14 extends downwardly in the transmission housing and is rotatably and slidably supported in a bearing 17 at the lower end of the transmission housing. Oppositely arranged gears 18 and 19 are journaled on the drive shaft and spaced apart by a sleeve 20 and mesh with a gear 21 secured to a propeller shaft 22 journaled in suitable bearings carried by the propeller housing 4. A propeller 24 is secured to the shaft 22 and is arranged in a plane slightly above the lower end of the transmission housing, as will be seen from Figure 1. The construction of the gears 18 and 19 is identical and each is provided with a comparatively long hub 25 journaled in a bearing 26 carried by the transmission housing. Secured or fixed to the hubs of the gears 18 and 19 are threaded elements 27 forming parts of clutches 28. Cup-shaped clutch elements 29 are journaled on the hubs 25 and are internally threaded to mesh with the threads of the clutch elements 27. Friction washers 30 are mounted on the hubs between the clutch elements 27 and 29. Coil springs 31 are mounted on the hubs and have one of their ends fixed to the clutch elements 29, while their other ends are fixed to the hubs 25 providing a yieldable drive between the clutch elements 29 and the hubs of the gears 18 and 19. The clutch elements 29 are provided with oppositely arranged lugs 32 and the drive shaft 14 has secured thereto pins 33 movable into and out of engagement with the lugs by the upward and downward movement of the drive shaft. It is to be understood the gears 18 and 19 each have a clutch and when the drive shaft is moved downwardly to engage one of the pins with the lugs of the clutch for the gear 18 will cause rotation of the propeller in one direction and a reverse rotation of the propeller is obtained by moving the drive shaft in an opposite endwise direction to engage one of the pins with the clutch of the gear 19. When both pins of the drive shaft are positioned to disengage both clutches the transmission is in neutral position, that is, the drive between the power shaft 14 and the propeller shaft is interrupted. Thus it will be seen that the transmission is capable of providing to the propeller forward and reverse speeds and a neutral position which will permit the propeller to remain idle during the running of the engine.

The springs and clutch elements comprising the clutches 28 provide shock absorbing mediums adapted to absorb sudden starting of the propeller shaft by the drive shaft when the clutches are engaged. As the operations of the clutches are identical a specific description of one is thought sufficient. With the engine running and the adjustment of the drive shaft to bring a pin into engagement with the lugs of a clutch, the clutch element 29 is threaded onto the clutch element 27 and as the clutch element 29 threads onto the clutch element 27 the spring 31 is tensioned slowly starting the respective gear of the transmission in rotation to take up the load of the propeller and as the clutch element 29 is fully threaded onto the clutch element 27 it binds the washer 30 between said clutch elements 29 and 27 providing a positive drive between said clutch elements permitting a drive from the drive shaft to the propeller shaft through the respective gears of the transmission. When the pin of the drive shaft is disengaged from the lugs 32 of the clutch, the spring 31 being under tension unwinds causing a reverse rotation of the clutch element 29 and bringing about an unthreading thereof from the clutch element 27 freeing the binding action upon the friction plate or washer 30 between the clutch elements 27 and 29. A clutch of this character relies upon the rotation of the drive shaft for its rotation, consequently rendering the engagement of the clutch comparatively easy to the operator as the operator only shifts the power shaft 14 endwise to start the engagement of the clutch.

While I have shown and described the preferred embodiment of my invention, it will be understood that minor changes in construction, combination and arrangement of parts may be made without departing from the spirit and scope of my invention, as claimed.

Having described the invention, I claim:

A clutch mechanism for outboard transmissions comprising an endwise movable power shaft, a gear journaled on said shaft, a cup-shaped clutch element journaled on the gear and internally threaded, a shock absorbing spring secured to the gear and to said clutch element, a threaded clutch element secured to the gear, lugs formed on the first-named clutch element, a pin secured to the power shaft, and a pivotally mounted control lever connected to the power shaft for imparting movement to the latter in an endwise direction for engaging and disengaging the pin with said lugs.

HENRY L. MATHIAS.